United States Patent [19]
Dunham

[11] Patent Number: 5,105,698
[45] Date of Patent: Apr. 21, 1992

[54] OFF FEED CONVEYOR FOR USE WITH WOODWORKING MILL MACHINES

[76] Inventor: Walter Dunham, 3129 N. Druid Hills Rd., Decatur, Ga. 30033

[21] Appl. No.: 672,044

[22] Filed: Mar. 18, 1991

[51] Int. Cl.⁵ .............................. B26D 7/06; B27C 1/12
[52] U.S. Cl. .................................. 83/155; 83/435.2; 83/477.2; 144/242 R; 144/245 R
[58] Field of Search ...................... 83/155, 477.2, 471, 83/435.2; 198/300, 312; 144/242 R, 245 R

[56] References Cited

U.S. PATENT DOCUMENTS

| | | | |
|---|---|---|---|
| 9,060 | 1/1852 | Hessin | 83/155 |
| 161,186 | 6/1875 | Kinney | 83/155 |
| 496,886 | 5/1893 | Matthews | 83/155 |
| 715,054 | 12/1902 | Graham | 83/155 |
| 762,653 | 6/1904 | Prescott | 83/155 |
| 1,584,029 | 5/1926 | Gottschalk | 83/155 |
| 1,978,142 | 10/1934 | Pettibone | 83/155 |
| 2,138,406 | 11/1938 | Huck | 83/155 |
| 2,148,379 | 2/1939 | McFarland et al. | 83/155 |
| 2,640,446 | 6/1953 | Morrison | 83/155 |
| 3,229,733 | 1/1966 | Albers | 83/155 |

OTHER PUBLICATIONS

Survey of Power Saw Accidents Resulting in Injuries, 1978, U.S. Dept. of Labor, Bureau of Labor Statistics, May 1983.

*Primary Examiner*—W. Donald Bray
*Attorney, Agent, or Firm*—Klauber & Jackson

[57] ABSTRACT

An off-feed conveyor for use with a woodworking mill machine, for off conveying wood workpiece output from the mill machine safely away from the mill operator. The conveyor includes a generally horizontal frame, and a movable endless conveying belt mounted in the frame with its upwardly facing outward surface defining a flat conveying surface for receiving the workpiece output from the mill machine. An adjustable height support frame is secured beneath the horizontal frame and supports the latter at a height appropriate for the belt surface to receive the workpiece output. Movement facilitating means are secured to the bottom of the support frame to enable movement of the conveyor toward and away from the mill machine. Contact engagement means at the lateral side of the horizontal frame, releasably attach the conveyor to the mill machine upon positioning thereat; and drive means move the belt in a direction to enable the off conveying.

7 Claims, 3 Drawing Sheets

OFF FEED CONVEYOR FOR USE WITH WOODWORKING MILL MACHINES

FIELD OF THE INVENTION

This invention relates generally to a safety apparatus for use with woodworking machines, and more specifically relates to an off-feed conveyor for use with a woodworking mill machine such as a table saw, shaper, radial arm saw, jointer, planer, or the like.

BACKGROUND OF THE INVENTION

Commercial woodworking machines are commonly provided with built-in systems, usually in the nature of endless conveyors, for discharging the products of the industrial machine. For example, Graham, U.S. Pat. No. 715,054, shows a sawing machine wherein the boards being sawed are returned for resawing by means of an integral slatted conveyor mounted below the table upon which the boards are sawed. Prescott, U.S. Pat. No. 762,653, shows a discharge conveyor for a band saw mill. Again, the discharge unit is in the form of an endless conveyor which is arranged to receive the cut boards.

Pettibone, U.S. Pat. No. 1,978,142, discloses a sawing rig for cutting boards from logs, which is provided with a conveyor mechanism for carrying away the cut boards and wood fragments from the saw as they fall down upon it.

Oleson, U.S. Pat. No. 4,007,654, shows a sawing apparatus of the pulpwood slasher type, which has a deck substantially in the form of a right triangle, and its side which corresponds to the hypotenuse has a series of circular saws. The saws have a lead such that when a cut is completed a wanted length drops onto a takeaway conveyor as it is cut free.

Gottschalk, U.S. Pat. No. 1,584,029, discloses a cordwood saw with a conveyor directly mounted thereon so that the conveyor will discharge the wood that has been sawed to any desired locality. The conveyor is described as detachably mounted, but in order to detach it from the saw the machine has to be partially disassembled.

In general, therefore, endless conveyors have been widely used industrially, not only in the log-cutting industry, but also in other industries, for discharging and conveying away products as they are formed. For example, Damant, U.S. Pat. No. 9,060, shows discharge conveyors for a lozenge-cutting machine. Monfort, U.S. Pat. No. 106,390 illustrates the use of endless conveyors with a tile-cutting machine. Kinney, U.S. Pat. No. 164,186, illustrates the use of endless conveyors for handling straight-cut tobacco. Huck, U.S. Pat. No. 2,138,406, describes a mechanism for cutting and delivering sheets from a web with the delivering effected by means of an endless conveyor. McFarland et al, U.S. Pat. No. 2,148,379, show a takeoff mechanism for handling shingles severed from a sheet. Even a candy-making machine has an endless takeoff and delivering mechanism in Morrison, U.S. Pat. No. 2,640,446.

While, therefore, takeoff conveyor mechanisms have been integrated into the large and often fixed commercial apparatus employed in many industries, such devices are not commonly found in conjunction with smaller woodworking machines of types used both commercially and by the handyman or the hobbyist, such as circular saws, band saws, jointers, routers, planers, and the like. These latter woodworking machines, for the most part consist only of the cutting mechanism appropriately mounted upon a table, with no automatic discharge means associated with it. In consequence, the user must use his hands frequently to remove the cut or worked wood, and injuries are not infrequent.

To illustrate: Safety experts have long been aware that most table saws are operated without the safety covers over the saw blade itself. All dado usage and rabbet operation of the saw cannot be accomplished with the safety guard in place—therefore most of the safety guards are left off all of the time. Unfortunately, in the common mode of use of such table saws, the sized material when pushed through the saw, falls off the end of the table and can cause a dangerous condition wherein the board may come in contact with the back of the saw blade and cause a "kick-back", thereby injuring the operator—sometimes even fatally. Reference may be had in this connection to *Survey of Power Saw Accidents Resulting in Injuries*, 1978. U.S. Department of Labor Bureau of Labor Statistics, May, 1983, which cites a very high incidence of injuries resulting from such saw kick-back.

In accordance with the foregoing, it may be regarded an object of the present invention, to provide a simple, highly dependable, portable, and easily attached off feed conveyor, for use with woodworking mill machines such as table saws, shapers, radial arm saws, jointers, planers, or similar machines that perform milling action on materials fed through same.

It is a further object of the invention, to provide an off feed conveyor of the foregoing character, which can be easily used with home woodworking machines; which can be contact-attached to them in a simple and rapid manner, and can similarly be detached rapidly without any disassembly; and which is self-sustaining so that the takeoff device may be separately stored as to not add to the bulk of the woodworking machine when it is not in use.

It is yet another object of the invention, to provide a detachable, self-sustaining conveyor device of the character indicated, which is adjustable with respect to speed and height, so that it can readily cooperate with the specific machine with which it is to be associated.

BRIEF SUMMARY OF THE INVENTION

Now, in accordance with the present invention, there is provided an off-feed conveyor for use with a woodworking mill machine, which functions to off convey the wood workpiece output from the mill safely away from the mill operator. The conveyor comprises in combination, a generally horizontal frame in which a movable endless conveying belt is mounted with its upwardly facing surface defining a flat conveying surface for receiving the workpiece output from said mill. An adjustable height support frame beneath the horizontal frame, supports the latter at a height appropriate for the belt surface to receive the workpiece output. Movement facilitating means are secured to the bottom of the support frame, for enabling movement of the off feed conveyor toward and away from the mill machine. Contact engagement means, such as magnets, are provided at the lateral side of the horizontal frame, for releasably attaching the conveyor to the mill machine upon positioning thereat; and means such as a drive motor are provided for moving the belt in a direction appropriate to enable the off conveying.

BRIEF DESCRIPTION OF THE DRAWINGS

The foregoing and other objects of the invention will be readily appreciated as the same become better understood by reference to the following detailed description, when considered in connection with the accompanying drawings, in which.

DETAILED DESCRIPTION OF THE INVENTION

Figure 1:
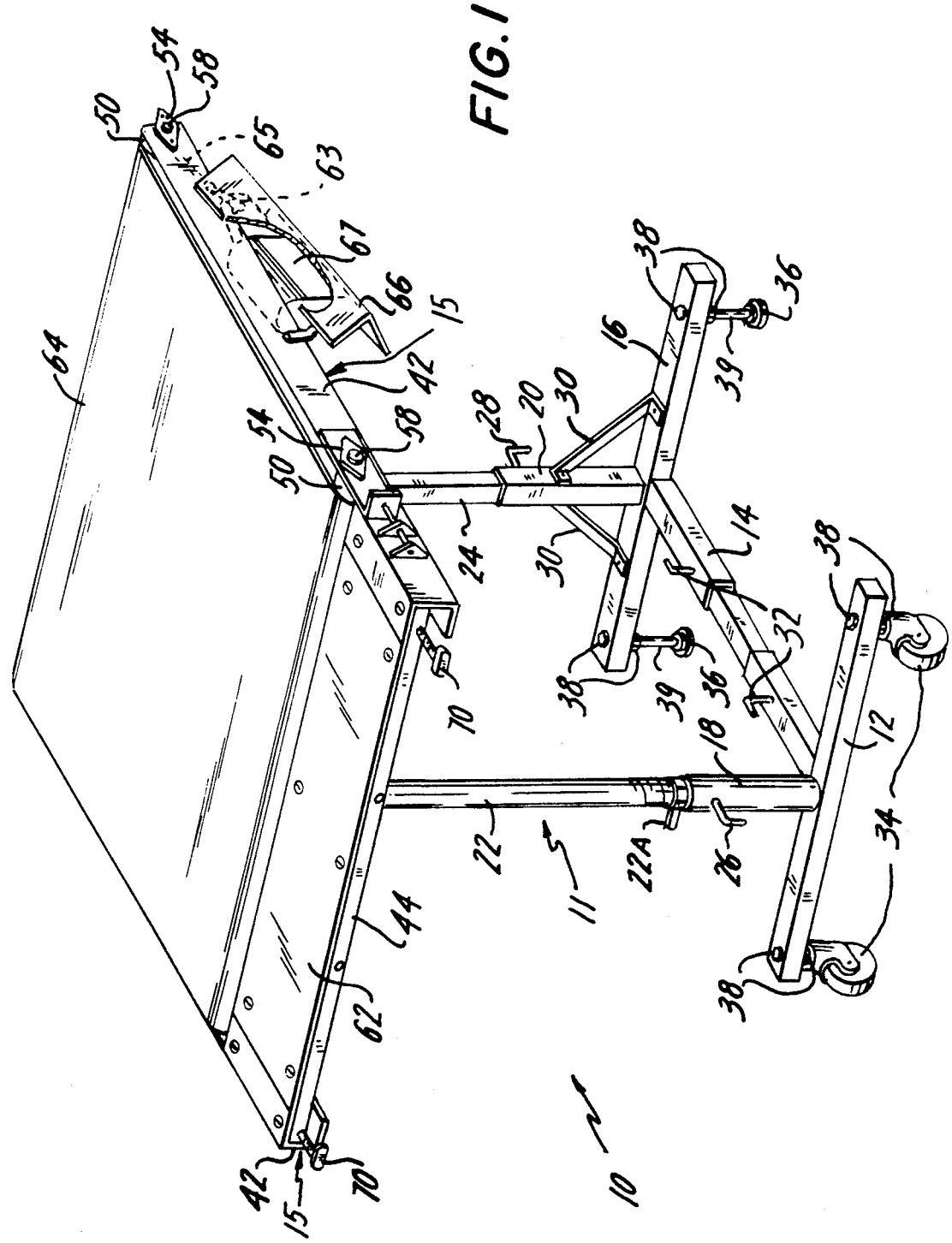
FIG. 1 is a perspective view of a preferred embodiment of an off-feed conveyor in accordance with the present invention.

Referring to the drawings, and particularly to FIG. 1, the conveyor 10 of the invention as shown in the embodiment illustrated, includes a generally horizontal frame 15, which is supported at an operator selected height by an adjustable height support frame 11. The latter is formed from crosspieces 12, 14, and 16, secured together in somewhat of an H shape. Extending upwardly from crossbars 12 and 16 are vertical posts 18 and 20 into which are telescopically received posts 22 and 24, respectively. Post 24 is slidable with post 20 and is engaged by a tightener 28 threaded in post 20 for adjusting the height of post 24. Post 22, on the other hand, is actually a threaded rod which is received by post 18. The height of post 22 is adjusted by rotating a hexagonal threaded nut 22A in the appropriate direction to achieve the proper height to match up with the woodworking mill machine. Tightener 26 is threaded into post 18 and is used to firmly secure maintenance of the required height. Brace 30 connects post 20 with crossbar 16 to ensure stability and rigidity.

Crossbars 12 and 16 are, in turn, supported upon means which enable easy movement of the conveyor 10 toward and away from the woodworking mill machine with which it is associated. In FIG. 1, crossbar 12 is thus shown as being supported upon two casters 34, whereas crossbar 16 is shown as being supported upon two sliders 36. The stems of the casters 34 are threaded at their ends and secured in place by nuts 38. The threaded portion 39 extending from slider 3 enables lengthening or shortening of the portion of same protruding beneath crossbar 16, to enable leveling of horizontal frame 15, thereby facilitating mating the conveyor 10 with a mill machine. All casters, all sliders, or other like means can be used for both crossbars.

Figure 2:
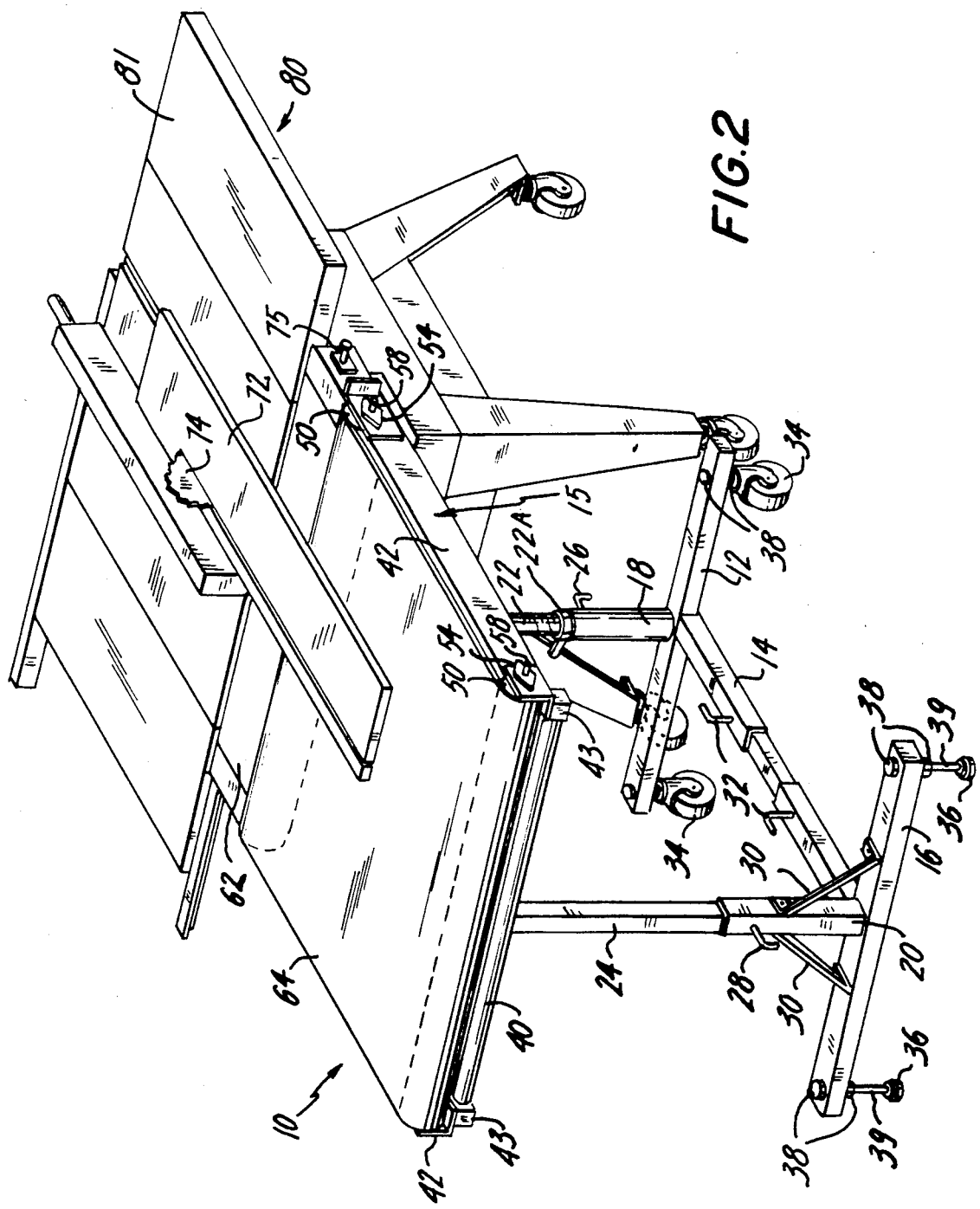
FIG. 2 is a further perspective view of the device of FIG. 1, but showing its opposite side, and showing such device associated with a circular saw table of a typical home workshop type.

As seen in FIG. 2, the upper end of rod 24 is secured by welding or the like to a crossbar 40. The rod 22 is also secured to a similar crossbar (not shown).

Figure 3:
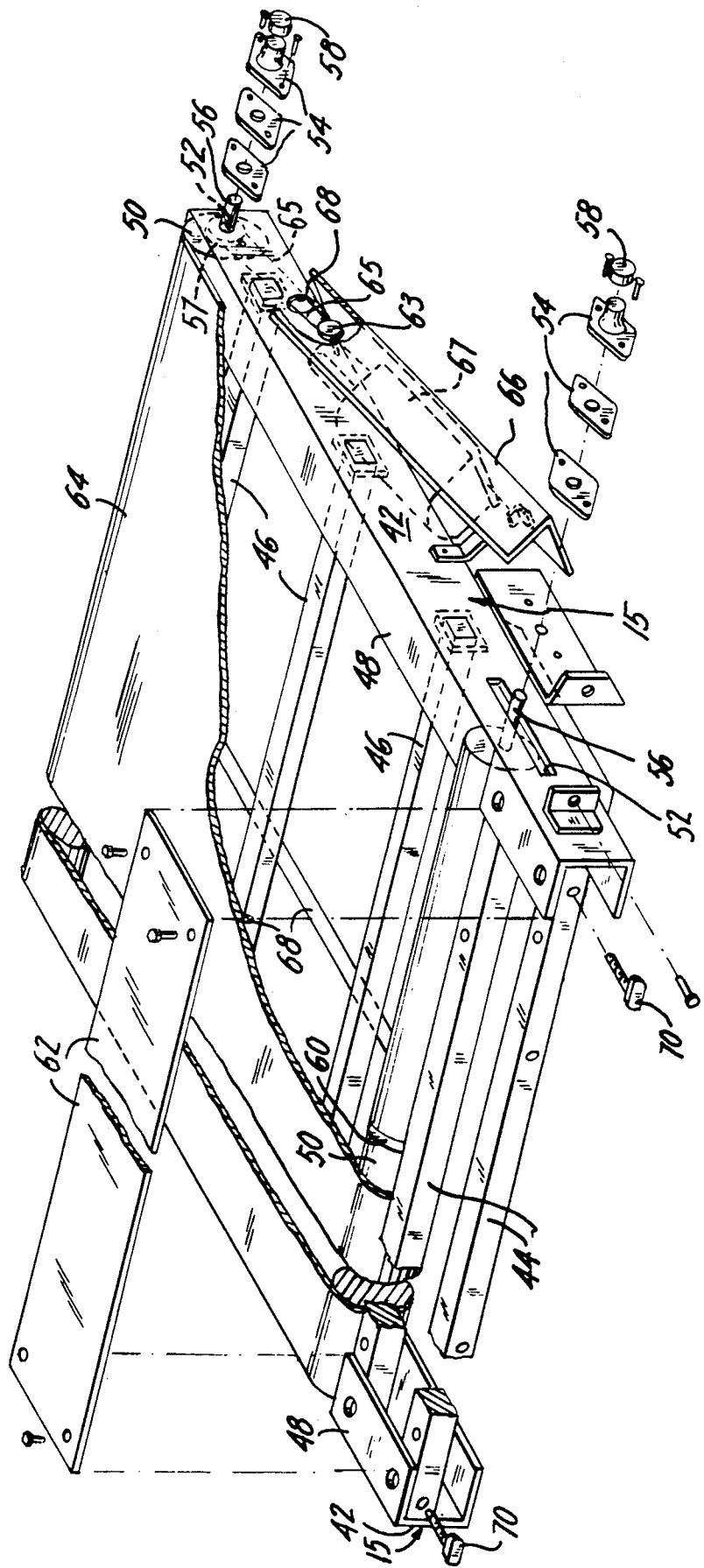
FIG. 3 is an exploded view of the horizontal frame portion of the conveyor construction shown in FIG. 1.

Mounted upon the support frame 11 is the horizontal frame 15 of conveyor 10, which includes the conveying component. As seen in FIG. 3, horizontal frame 15 includes two U-channel side portions 42, cross-strips 44, and reinforcing cross-pieces 46. U-channel portions 42 carry brackets 43, seen in FIG. 2, which receive the ends of each crossbar 40 to connect the top structure to the supporting frame. Referring back to FIG. 3, the upper web 48 of members 42 is cut away to receive rollers 50 which extend into slots 52 by means of stems 56 which are covered by caps 58. Each roller 50 is formed with a central circumferential recess 60. A plate 62 is secured to strips 44 and covers the space between them. As seen in FIG. 2, plate 62 also provides a transition zone between the woodworking machine and belt 64.

Referring back to FIG. 3, trained about rollers 50 is a continuous-belt 64 which suitably has a roughened high-friction surface. A particularly suitable material for use in belt 64 is commercially available under the trademark POLYVINYLOK, especially Grade MRT, from the Georgia Duck and Cordage Mill in Scottdale, GA. The continuous belt 64 has an inner ridge 68 which is received in groove 60 so that the belt is always kept in alignment when running. FIG. 1, shows that the conveyor belt 64 is driven by a conventional motor 67 supported on member 66 and provided with means such as gears and a V-belt 65 to drive the associated roller 50. The details of the motor/chain-drive assembly are shown in FIG. 3. Referring to FIG. 3, motor 67 is shown secured to member 66. The drive pulley 63 of motor 67 drives belt 65 which in turn enables roller 50 to rotate by means of the attached pulley 57. Drive belt 65 transverses member 42 through aperture 68. This assembly insures that chain drive 65 shields the operator from potential injury which would otherwise result if drive belt 65 was left exposed.

In accordance with the invention the conveyor 10 is formed with means for rapidly and releasably attaching and detaching same from the frame of a conventional home workshop woodworking machine—preferably by contact engaging means such as permanent magnets. As seen in FIG. 2, device 10 is thus releasably attached to a woodworking mill 80, illustratively shown as a table saw. The board 72 being cut by the saw 74 is automatically carried away by the belt 64 of device 10 which has been moved into position next to the circular saw table 81. In the embodiment shown in FIG. 1, the releasable attaching means is in the form of permanent magnets 70, which are supported at the ends of threaded stems which are threaded into the top structure of the device so that the spacing of the magnets from the end of the device 10 can be readily adjusted to compensate for any irregularities in the woodworking machine table 81. When this is done, the magnets 70 automatically hold the conveyor 10 against the saw table 81, but when use of the saw is finished, the device 10 can be easily pulled away and separately stored. It will be seen from FIG. 2 that the top surface of device 10 is level with the top surface of the table 81. This is accomplished merely by adjusting posts 24 and 22. The speed of the belt is easily regulated, suitably by adjusting the speed of the driving motor by means of a speed regulator 75 associated with it to suit the requirements of the user. The speed regulator 75 can be carried by the portion 42 or may be positioned in any other location convenient to the operator.

It will be understood that the device 10 can in similar manner be used with other home workshop woodworking machines such as band saws, routers, and the like, for safely discharging the wood worked upon or cut. Furthermore, while it will be evident from the foregoing description that conveyor 10 is ideally adapted for use in home workshops and the like, it will be equally clear that such device can be used with other woodworking machinery, including commercial such machines as found in woodworking factories and the like.

It is intended, therefore, that all matter contained in the foregoing description and in the drawings, shall be interpreted as illustrative only, and not in a limiting sense.

What is claimed is:

1. An off feed conveyor for use with a woodworking mill machine, for off conveying wood workpiece output from said mill safely away from the mill operator; comprising in combination:

a generally horizontal frame; a movable endless conveying belt mounted in said frame with its upwardly facing outward surface defining a flat conveying surface for receiving said workpiece output from said mill machine; an adjustable height support frame secured beneath and supporting said horizontal frame at a height appropriate for said belt surface to receive said workpiece output; movement facilitating mean secured to the bottom of said support frame for enabling movement of said conveyor toward and away from said mill machine; contact engagement means at the lateral side of said horizontal frame for releasably attaching said conveyor to said mill machine upon being positioned thereat; and drive means for moving said belt in a direction to enable said off conveying.

2. A device as defined in claim 1, wherein said contact engagement means for releasably attaching said conveyor to said mill machine, comprises permanent magnets.

3. A device as defined in claim 1, wherein said means for facilitating movement comprises casters.

4. A device as defined in claim 1, wherein said driving means comprises an electric motor.

5. A device as defined in claim 1, wherein said endless belt has a roughened, high-friction surface.

6. A device as defined in claim 5, wherein said belt has a central longitudinal recess formed on its inner surface and said belt is carried over rollers having central circumferential ridges received in said recess.

7. A device as defined in claim 1, including means for leveling the said horizontal frame to facilitate mating of said conveyor with said mill machine.

* * * * *